April 20, 1943.  D. B. DEWEY ET AL  2,316,940
BLOWER CONTROL FOR MECHANICAL DRAFT COOLING TOWERS
Filed Feb. 2, 1942  2 Sheets-Sheet 1
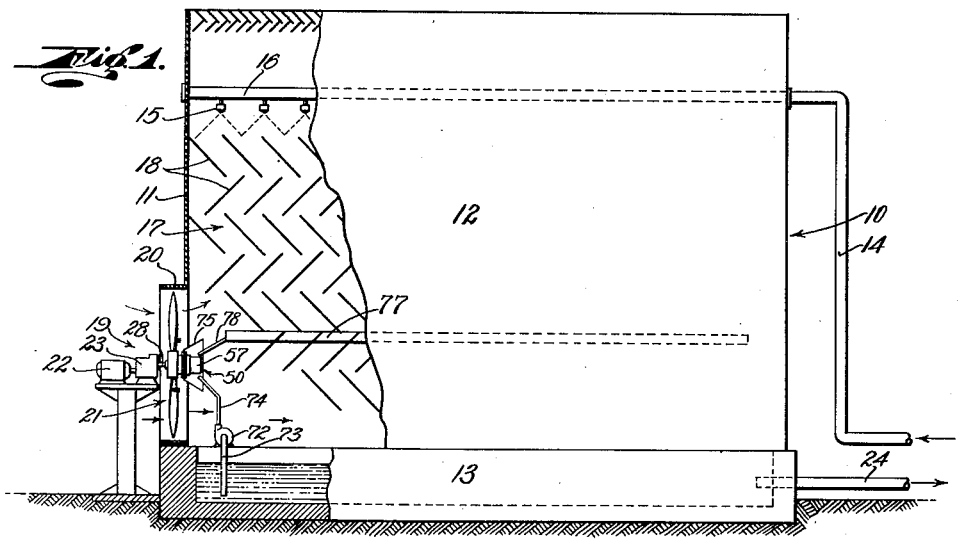
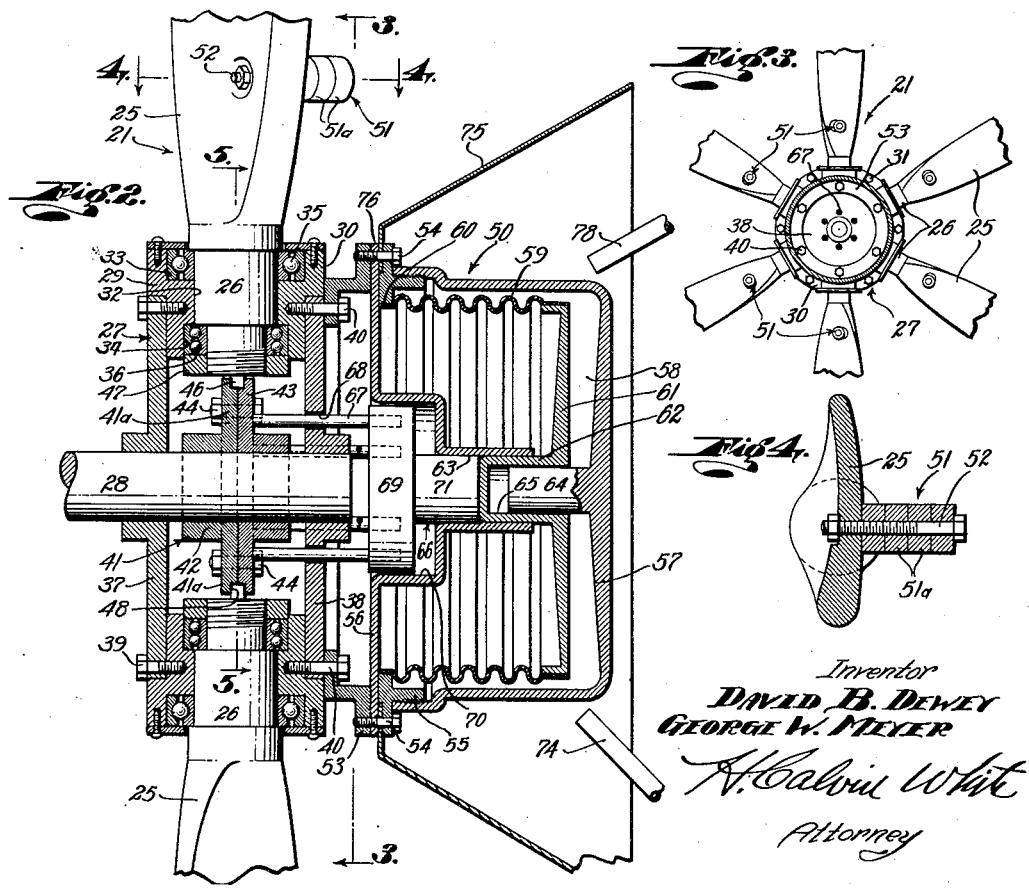
Inventor
DAVID B. DEWEY
GEORGE W. MEYER
H. Calvin White
Attorney April 20, 1943.   D. B. DEWEY ET AL   2,316,940
BLOWER CONTROL FOR MECHANICAL DRAFT COOLING TOWERS
Filed Feb. 2, 1942   2 Sheets-Sheet 2
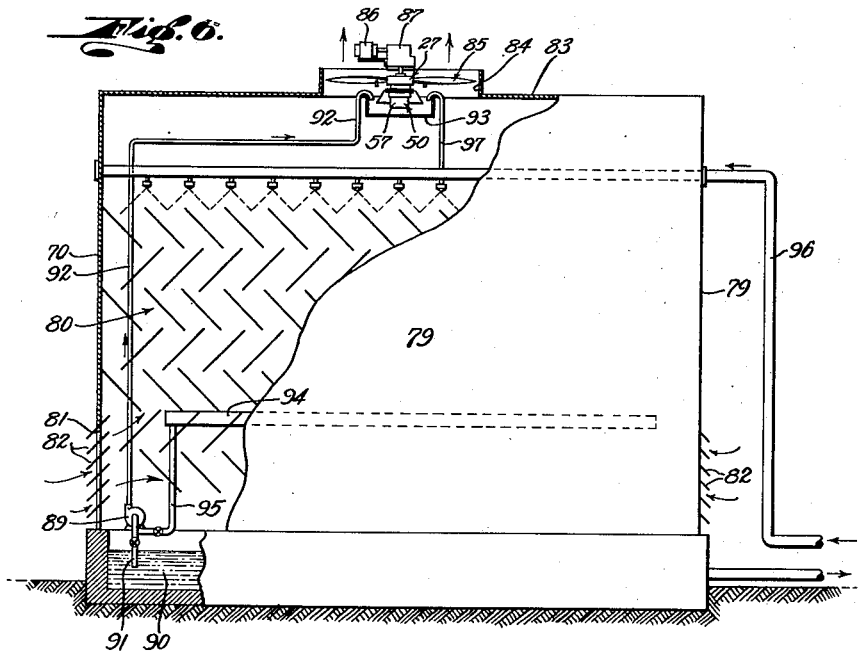
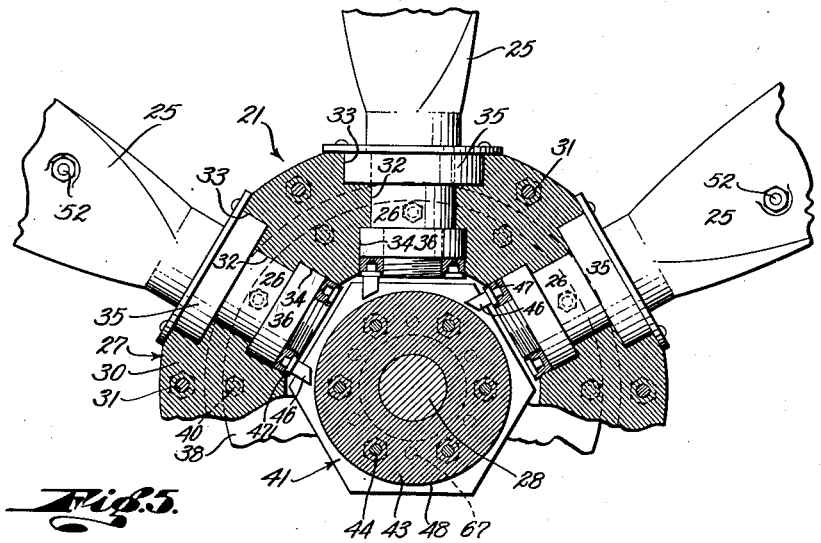
Inventor
DAVID B. DEWEY
and GEORGE W. MEYER
Attorney Patented Apr. 20, 1943

2,316,940

UNITED STATES PATENT OFFICE 2,316,940

BLOWER CONTROL FOR MECHANICAL DRAFT COOLING TOWERS

David B. Dewey, Pasadena, and George W. Meyer, Los Angeles, Calif., assignors, by mesne assignments, to The Fluor Corporation, Ltd., Los Angeles, Calif., a corporation of California Application February 2, 1942, Serial No. 429,274

10 Claims. (Cl. 261—26)

This invention relates generally to the control of air fans or blowers in mechanical draft water cooling towers, and deals particularly with improvements in control systems of the type disclosed in Patent No. 2,287,297, issued June 23, 1942, to David B. Dewey on Mechanical draft cooling towers.

The Dewey application describes a control system in mechanical draft water cooling towers through which the air flow is maintained by a variable pitch blade fan driven by a constant speed motor, and comprising a control mechanism operable to vary, in accordance with water temperature changes, the fan blade pitch, and therefore the rate of air flow, independently of the speed of the motor. Among the important advantages of this type of control, are its adaptability to the use of constant speed motors, instead of the more expensive variable speed motors heretofore required to permit variations in the air throughput, and the ability of the system to maintain, automatically, predetermined cooling of the water, or a given bottom temperature, despite such changing conditions as variations in the inlet or warm water temperature, rate of water flow through the tower, and atmospheric temperature and humidity.

Among the objects of the present invention is to provide means whereby a portion of the water to be cooled in the tower, or water which is undergoing cooling or has been fully cooled, may be diverted from its normal path of flow into heat exchange relation with the temperature-responsive part of the fan blade control mechanism.

Another object is to utilize a simplified form of control mechanism carried by and rotating with the blower hub, and conveniently adapted by reason of its direct association with the hub, to receive water diverted as indicated above, from any selected cooling stage depending upon the basis selected for maintenance of the blower control.

Various other features are contemplated by the invention, but all these, as well as the objects mentioned, will be better understood from the following description of the invention as embodied in certain typical and illustrative forms. Throughout the description, reference is had to the accompanying drawings, in which:

Fig. 1 is a general elevation, partly in section, showing an embodiment of the invention in a forced draft water cooling tower;

Fig. 2 is an enlarged cross-section of the blower hub assembly;

Fig. 3 is a reduced scale section on line 3—3 of Fig. 2;

Fig. 4 is a cross-section on line 4—4 of Fig. 2;

Fig. 5 is a fragmentary portion of the cross-section indicated by line 5—5 of Fig. 2; and Fig. 6 is a view similar to Fig. 1, showing the invention incorporated in an induced draft type cooling tower.

It is to be understood that the invention is in no way limited to the particular type or construction of the cooling tower proper, and that the invention is to be regarded as being generally applicable to the control of variable pitch fan blades operating to produce forced or induced air flow through the water cooling chambers of mechanical draft towers in general. Merely as illustrative, Fig. 1 shows a conventionally illustrated forced draft tower 10 comprising closed or continuous side and end walls 11 and 12 above the cooled water collecting basin 13. Warm water supplied to the tower through line 14 is sprayed downwardly from nozzles 15 of the header 16 into the water cooling chamber 17 which, if desired, may contain a suitable arrangement of baffles 18. The water sprayed into chamber 17 is cooled by contact with an upwardly flowing air stream created by the blower assembly 19 positioned within the usual fan ring 20 at the lower portion of the tower. Assembly 19 comprises a fan or blower 21 suitably driven, as by a motor 22 operating through a reduction gear conventionally illustrated at 23. As will later appear, the present type of control advantageously adapts the blower assembly 19 to the use of a constant-speed motor 22, as distinguished from variable-speed motors heretofore employed to obtain variations in the blower speed and its air displacement. The cooled water collecting in basin 13 is removed through line 24.

Referring now to the details of the blower construction shown in Fig. 2, the blower or fan itself comprises a suitable number of blades 25 terminating in stub ends or shafts 26 journaled within a hub structure 27 non-rotatably secured to the shaft 28. The hub structure 27 comprises a pair of annular castings 29 and 30 interconnected by bolts 31, see Fig. 3, and containing radial bores 32 between counterbores 33 and 34, which receive the stub ends 26 of the fan blades, and the bearings 35 and 36, which support the blades for axial rotation relative to the hub. The hub structure further comprises a pair of members 37 and 38 secured to castings 29 and 30 by screws 39 and 40, all as illustrated.

The shaft 28 carries a sleeve 41 comprising annular sections 42 and 43 connected by bolts 44, the sleeve being longitudinally movable on the shaft 28, while rotating therewith, under the influence of the later described temperature-responsive control. The displaceability of sleeve 41 on the shaft is utilized to produce axial rotation of the blades 45, and therefore variation of the blade pitch in accordance with the displaced position of the sleeve. As a typical operative connection between the sleeve and the stub ends of the blades, the latter are shown to carry lugs 46, see Fig. 5, projecting from the bearing-retaining ring 47 at one side of the blade axis into an annular groove 48 in the flanged portion 41a of the sleeve 41. Lugs 46 may be rotatably seated within rings 47I, so that the surfaces of the lug will remain at all positions of the sleeve 41, in flat engagement with the sides of the recess 48.

From the foregoing it will be understood that, as viewed in Fig. 2, as sleeve 41 is shifted toward the left, it will act through lugs 46 to produce axial rotation of the blades 45 in a direction increasing the blade pitch. In the absence of force exerted against sleeve 41 tending to increase the blade pitch, or to retain a given pitch, the normal tendency during rotation of the blower will be for the blades to return to positions of zero or no pitch. The effective force applied to sleeve 41 in a direction tending to increase the blade pitch, is that transmitted from the temperature-responsive control, generally indicated at 50. However, in order to sensitize the operation of the control, and to avoid necessity for the control itself to develop the relatively great amount of force required for displacement of sleeve 41 as the fan blades reach positions of considerable or maximum pitch, it is desirable that means independent of the control 50 be employed to reduce the force required for displacement of sleeve 41 through the operating range. While this compensation may be made as desired, a simple expedient is to attach to each blade 25 a mass 51 of appreciable weight and at a location that may be offset a short distance from the longitudinal center or axis of the blade. Positioned as shown in the drawings, each individual mass 51 tends to overcome partially the normal tendency of the blade to return, by virtue of the blower rotation, to a position of zero pitch. This normal blade tendency is, however, not completely overcome by the mass 51 (so that the blades of themselves will return to zero pitch), but by virtue of their tendency toward increasing the blade pitch, masses 51 correspondingly reduce the amount of force required for that purpose to be applied to sleeve 41. Suitable provision may be made for adjustably varying the effects of masses 51, as by making them in the form of a plurality of individual weights 51a supported on bolts 52, so that the blade rotating effect of the masses may be correspondingly increased or decreased, by adding to or removing from the masses 51 the same number or effective weight of the individual units 51a.

The hub assembly 27 carries an adapter ring 53 supported by screws 40 and attached by screws 54 to a ring 55 and a guide member 56. Threaded upon or otherwise secured to ring 55 is a heat conductive housing 57, cast for example of brass or a suitable alloy, which encloses a chamber 58 containing a fluid pressure displaceable means, such as a diaphragm or metallic bellows 59, attached at 60 to the ring 55. The outer end of the bellows carries a plate 61 having a tubular socket 62 guided in its axial movement within a correspondingly formed portion 63 of member 56. Plate 61, in turn, has a guide support by the housing 57, in the form of a cylindric portion 64 projecting within bore 65.

Expansion of fluid in chamber 58 produces a displacement toward the left of plate 61, which is transmitted through its central portion 62 to the shaft-carried sleeve 41 by head 66 carrying fingers or pins 67, extending through opening 68 into engagement with the flanged face of the sleeve 41. The head 66 has a larger diameter portion 69 carrying the pins 67 and accommodated within recess 70, and a small diameter portion 71 supported and guided within the bore of member 63. As the pressure in chamber 58 overcomes the resistance of the blades against their axial turning in directions of increasing pitch, the pressure against plate 61 is transmitted through members 62, 66 and pins 67 to sleeve 41, shifting the latter toward the left (i. e., in a blade pitch increasing direction). As the pressure in chamber 58 thereafter becomes reduced, the blade reaction transmitted to sleeve 41 correspondingly shifts the parts back toward the right.

It will be understood that the operation of the control mechanism may be regulated to maintain any desired range of cooling of the tower water, of course within practicable limits. Merely as illustrative, the blower control may operate to maintain a cooled water temperature within or above the basin 13 of around 70 to 75° F. Also, by proper selection of an expansion fluid to be contained in the bellows chamber 58, the control mechanism 50 may operate to axially rotate the fan blades through their full range of pitch variation, for any suitable range of temperature transmitted to the expansion fluid through the housing 57. Expansion fluids of different compositions suitable for such purposes, are well known to those familiar with the art. Again as illustrative, the expansion fluid may be selected to cause the blade pitch to vary from zero to positions of maximum angularity, in response to a water temperature variation within a range of 10° F., more or less, depending upon the sensitivity desired.

The invention is more directly concerned with the systems now to be described for diverting the cooling tower water from its normal path of flow, into heat exchange relation with the temperature-responsive control 50. Accordingly, in the broad aspects of the invention, the described mechanisms for varying the fan blade pitch are to be regarded merely as typical, though preferred, means for changing the air displacement capacity of the blower in accordance with changing water temperatures transmitted to the temperature-responsive control. It may be observed further, however, that the illustrated, hub-carried mechanism is of particular advantage to serve the purposes of the invention, by reason of the convenient adaptability of the temperature-responsive device 50 to be maintained in heat exchange relation with water that may be taken or diverted from any selected point in the course of its flow through the tower.

It is contemplated that the blower control may be regulated in accordance with the temperature of the tower water either before or after the water is cooled to its lowest temperature, and further, that any suitable means may be employed to divert the water from its otherwise normal flow at any selected location, into contact with the temperature-responsive control 50.

To illustrate, where it is desired to control the fan blade pitch in accordance with the temperature of the fully cooled water, a portion of the water in the collector basin 13 may be diverted from its normal flow to the outlet line 24, by a pump 72 taking suction through line 73 and discharging the water through pipe 74 against the outside of housing 57. If desired, the latter may be enclosed by a shield or baffle 75 attached as at 76 to the hub assembly. Where it is desired to control the blower in accordance with the temperature of water not fully cooled, or water that may be substantially fully cooled before reaching the basin 13, then the water diversion against the control device 50 may be accomplished in a relatively simple manner, as by collecting some of the water in a trough 77 extending transversely within the cooling chamber, and diverting the water through pipe 78 against the housing 57. Trough 77 may be extended across substantially the width of the tower, or any considerable distance within the water cooling chamber, to obtain water of an average temperature for diversion to the fan control.

Fig. 6 illustrates an adaptation of the invention as applied to an induced draft tower comprising walls 79 enclosing a cooling chamber 80, into the lower portion of which air is drawn through suitable inlets, such as openings 81 containing an arrangement of louvers. The top of the cooling chamber may be closed by wall 83 except for opening 84 containing a blower 85 operated by motor 86 through gear-box 87 to produce an upward or induced draft of air through the cooling chamber 80. As will be understood, the hub-contained mechanism 27 and temperature-responsive control 50 are the same as those previously described with reference to Figs. 1 and 2.

As before, the control 50 may be made to respond to the temperature of water diverted from any suitable location in its course of flow through the tower. Thus, pump 89 may operate to elevate water from body 90 through pipes 91 and 92 into an overflow basin or chamber 93 within which the housing is immersed; or instead, the water taken by pump 89 may be diverted from an intermediate location within chamber 80, through trough 94 and pipe 95. For particular purposes, it may be desirable to control the blower in accordance with the inlet water temperature, in which event a portion of the warm water introduced to the tower through line 96 may be diverted through pipe 97 into the overflow chamber 93.

We claim:

1. In a mechanical draft cooling tower having walls forming a cooling chamber, and means for passing water through said chamber; the combination comprising a blower having a rotating hub with variable pitch blades and operating to cause air to flow through said chamber in intimate contact with the water therein, a motor for driving said blower, temperature-responsive means operable to vary the pitch of said blades and carried by said hub, and means for directing a portion of said water in heat transferring relation with said temperature-responsive means to vary the rate of air flow through said chamber in accordance with changes in the water temperature and independently of the speed of said motor.

2. In a mechanical draft cooling tower having walls forming a cooling chamber, and means for passing water through said chamber; the combination comprising a blower having a rotating hub with variable pitch blades and operating to cause air to flow through said chamber in intimate contact with the water therein, a motor for driving said blower, temperature-responsive means operable to vary the pitch of said blades and contained within a portion of said hub, and means for directing a portion of said water over the outside of said portion of the hub and in heat transferring relation with said temperature-responsive means to vary the rate of air flow through said chamber in accordance with changes in the water temperature and independently of the speed of said motor.

3. In a mechanical draft cooling tower having walls forming a cooling chamber, and means for passing water through said chamber; the combination comprising a blower having a rotating hub with variable pitch blades and operating to cause air to flow through said chamber in intimate contact with the water therein, a motor for driving said blower, temperature-responsive means operable to vary the pitch of said blades and carried by said hub, said temperature-responsive means comprising a wall rotatable with the hub and containing an expansible fluid, and means transmitting the expansive force of the fluid to said blades, and means for directing said water in heat transferring relation with said expansible fluid to vary the rate of air flow through said chamber in accordance with changes in the water temperature.

4. In a mechanical draft cooling tower having walls forming a cooling chamber, and means for passing water through said chamber; the combination comprising a blower having a rotating hub with variable pitch blades and operating to cause air to flow through said chamber in intimate contact with the water therein, a motor for driving said blower, temperature-responsive means operable to vary the pitch of said blades and carried by said hub, said temperature-responsive means comprising a housing rotatable with the hub and containing an expansible fluid, and means including a flexible diaphragm for transmitting the expansive force of the fluid to said blades, and means directing a portion of said water over the outside of said housing to vary the rate of air flow through said chamber in accordance with changes in the water temperature.

5. In a mechanical draft cooling tower having walls forming a cooling chamber, and means for passing water through said chamber downwardly into a collecting basin; the combination comprising a blower having a rotating hub with variable pitch blades and operating to cause air to flow through said chamber in intimate contact with the water therein, a motor for driving said blower, temperature-responsive means operable to vary the pitch of said blades and carried by said hub, and means for diverting a portion of the downwardly flowing water from a point above the said basin in heat transferring relation with said temperature-responsive means to vary the rate of air flow through said chamber in accordance with changes in the water temperature and independently of the speed of said motor.

6. In a mechanical draft cooling tower having walls forming a cooling chamber, and means for passing water through said chamber downwardly into a collecting basin; the combination comprising a blower having a rotating hub with variable pitch blades and operating to cause air to flow through said chamber in intimate contact with the water therein, a motor for driving said blower, temperature-responsive means operable to vary the pitch of said blades and carried by said hub, said temperature-responsive means comprising a housing rotatable with the hub and containing an expansible fluid, and means including a flexible diaphragm for transmitting the expansive force of the fluid to said blades, and means for diverting a portion of the downwardly flowing water from a point above said basin over the outside of said housing to vary the rate of air flow through said chamber in accordance with changes in the water temperature.

7. In a mechanical draft cooling tower having walls forming a cooling chamber, and means for passing water through said chamber; the combination comprising a blower having a rotating hub with variable pitch blades and operating to cause air to flow through said chamber in intimate contact with the water therein, a motor for driving said blower, temperature-responsive means operable to vary the pitch of said blades and carried by said hub, and means for pumping a stream of said water in heat transferring relation with said temperature-responsive means to vary the rate of air flow through said chamber in accordance with changes in the water temperature and independently of the speed of said motor.

8. In a mechanical draft cooling tower having walls forming a cooling chamber and means for passing water through said chamber; the combination comprising a blower having a rotating hub with variable pitch blades and operating to cause air to flow through said chamber in intimate contact with the water therein, a motor for driving said blower, temperature-responsive means operable to vary the pitch of said blades and carried by said hub, said temperature-responsive means comprising a housing rotatable with the hub and containing an expansible fluid, and means including a flexible diaphagm for transmitting the expansive force of the fluid to said blades, and means for pumping a stream of said water over the outside of said housing to vary the rate of air flow through said chamber in accordance with changes in the water temperature.

9. In a mechanical draft cooling tower having walls forming a cooling chamber, and means for passing water downwardly through said chamber; the combination comprising a blower having a rotating hub with variable pitch blades and operating to cause air to flow through said chamber in intimate contact with the water therein, a motor for driving said blower, temperature-responsive means carried by said hub and operable to vary the pitch of said blades, and means for directing stream of said water at substantially the temperature at which the water is introduced to the chamber, into heat transferring relation with said temperature-responsive means to vary the rate of air flow through said chamber in accordance with changes in the water temperature and independently of the speed of said motor.

10. In a mechanical draft cooling tower having walls forming a cooling chamber, and means for passing water downwardly through said chamber; the combination comprising a blower having a rotating hub with variable pitch blades and operating to cause air to flow through said chamber in intimate contact with the water therein, a motor for driving said blower, temperature responsive means operable to vary the pitch of said blades, and means for directing a portion of said water being passed to the chamber and at substantially the temperature at which it is introduced to the chamber, into heat transferring relation with said temperature-responsive means to vary the rate of air flow through said chamber in accordance with changes in the water temperature and independently of the speed of said motor.

DAVID B. DEWEY.
GEORGE W. MEYER.